(12) United States Patent
Wang et al.

(10) Patent No.: US 12,489,665 B2
(45) Date of Patent: Dec. 2, 2025

(54) PEAK SUPPRESSION FOR SIDELINK TRANSMISSIONS

(71) Applicant: QUALCOMM Incorporated, San Diego, CA (US)

(72) Inventors: Xiaojie Wang, Hillsborough, NJ (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 18/097,968

(22) Filed: Jan. 17, 2023

(65) Prior Publication Data
US 2024/0243958 A1    Jul. 18, 2024

(51) Int. Cl.
*H04L 27/26* (2006.01)
*H04W 72/40* (2023.01)

(52) U.S. Cl.
CPC ......... *H04L 27/2614* (2013.01); *H04W 72/40* (2023.01)

(58) Field of Classification Search
CPC ..... H04L 27/2614; H04L 5/003; H04L 5/001; H04L 5/0044; H04L 5/0094; H04L 27/0006; H04L 5/0051; H04L 5/0055; H04L 5/0057; H04W 72/40; H04W 52/52; H04W 74/0816; H04W 76/20; H04W 52/146; H04W 52/48; H04W 72/0446; H04W 72/23; H04W 74/0808; H04W 92/18
See application file for complete search history.

(56) References Cited

U.S. PATENT DOCUMENTS

2022/0346041 A1* 10/2022 Ko .................... H04L 5/0048
2023/0354220 A1* 11/2023 Rastegardoost ........ H04L 5/001
2024/0188099 A1*  6/2024 Hwang ............. H04W 72/0446

OTHER PUBLICATIONS

63336047_Specification_Drawings_Apr. 28, 2022 (Year: 2022).*

* cited by examiner

*Primary Examiner* — Rushil P. Sampat
(74) *Attorney, Agent, or Firm* — Seyfarth Shaw LLP

(57) ABSTRACT

A method for wireless communication by a first sidelink user equipment (UE) includes suppressing one or more signal peaks associated with a sidelink message based on a configuration for suppressing the one or more signal peaks associated with the sidelink message. The method also includes selectively transmitting, to a second sidelink UE, a peak information suppression message (PSIM) indicating the one or more suppressed signal peaks and/or one or more filled signal values based on suppressing the one or more signal peaks. The method further includes transmitting the sidelink message, to the second sidelink UE, based on suppressing the one or more signal peaks.

30 Claims, 11 Drawing Sheets

PEAK SUPPRESSION FOR SIDELINK TRANSMISSIONS

FIELD OF THE DISCLOSURE

The present disclosure relates generally to wireless communications, and more specifically to peak suppression for sidelink transmissions.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. Narrowband (NB)-IoT and enhanced machine-type communications (eMTC) are a set of enhancements to LTE for machine type communications. There exists a need for further improvements in 5G NR technology. These improvements may also be applicable to other multi-access technologies and the telecommunications standards that employ these technologies.

Wireless communications systems may include or provide support for various types of communications systems, such as device-to-device (D2D) communication systems over a D2D wireless link. These communications can be referred to as sidelink communications. A sidelink user equipment (UE), such as a vehicle, is an example of a D2D communication device.

A signal transmitted by a sidelink UE may have an associated peak-to-average power ratio (PAPR). As the PAPR increases, an efficiency of a power amplifier (PA) amplifying the signal, for example, a ratio of output power to input power for the PA, may decrease. Sidelink UEs associated with PAs that have a decreased efficiency may consume more power or have other performance drawbacks.

SUMMARY

In one aspect of the present disclosure, a method for wireless communication by a first sidelink user equipment (UE) includes suppressing one or more signal peaks associated with a sidelink message based on a configuration for suppressing the one or more signal peaks associated with the sidelink message. The method further includes selectively transmitting, to a second sidelink UE, a peak information suppression message (PSIM) indicating the one or more suppressed signal peaks and/or one or more filled signal values based on suppressing the one or more signal peaks. The method still further includes transmitting the sidelink message, to the second sidelink UE, based on suppressing the one or more signal peaks.

Another aspect of the present disclosure is directed to an apparatus including means for suppressing one or more signal peaks associated with a sidelink message based on a configuration for suppressing the one or more signal peaks associated with the sidelink message. The apparatus further includes means for selectively transmitting, to a second sidelink UE, a PSIM indicating the one or more suppressed signal peaks and/or one or more filled signal values based on suppressing the one or more signal peaks. The apparatus still further includes means for transmitting the sidelink message, to the second sidelink UE, based on suppressing the one or more signal peaks.

In another aspect of the present disclosure, a non-transitory computer-readable medium with non-transitory program code recorded thereon is disclosed. The program code is executed by a processor and includes program code to suppress one or more signal peaks associated with a sidelink message based on a configuration for suppressing the one or more signal peaks associated with the sidelink message. The program code further includes program code to selectively transmit, to a second sidelink UE, a PSIM indicating the one or more suppressed signal peaks and/or one or more filled signal values based on suppressing the one or more signal peaks. The program code still further includes program code to transmit the sidelink message, to the second sidelink UE, based on suppressing the one or more signal peaks.

Another aspect of the present disclosure is directed to an apparatus having a processor and a memory coupled with the processor and storing instructions operable, when executed by the processor, to cause the apparatus to suppress one or more signal peaks associated with a sidelink message based on a configuration for suppressing the one or more signal peaks associated with the sidelink message. Execution of the instructions further cause the apparatus to selectively transmit, to a second sidelink UE, a PSIM indicating the one or more suppressed signal peaks and/or one or more filled signal values based on suppressing the one or more signal peaks. Execution of the instructions also cause the apparatus to transmit the sidelink message, to the second sidelink UE, based on suppressing the one or more signal peaks.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
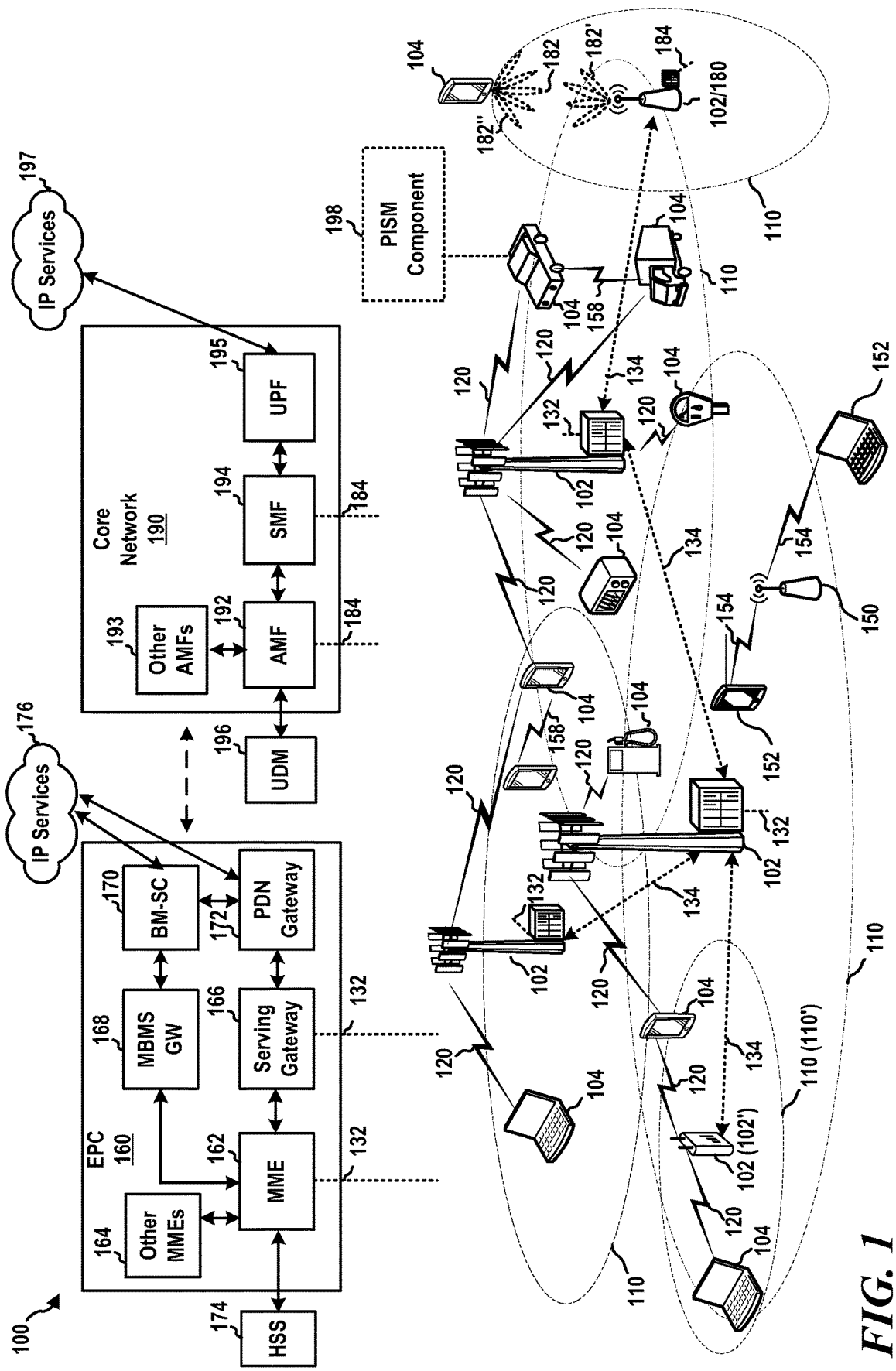
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology associated with 5G wireless technologies, aspects of the present disclosure can be applied in later generations, including for 6G wireless technologies, or in other wireless communications systems.

In cellular communications networks, wireless devices may generally communicate with each other via access links with one or more network entities such as a base station or scheduling entity. Some cellular networks may also support device-to-device (D2D) communications that enable discovery of, and communications among, nearby devices using direct links between devices (for example, without passing through a base station, relay, or other network entity). D2D communications may also be referred to as point-to-point (P2P) or sidelink communications. D2D communications may be implemented using licensed or unlicensed bands. Using D2D communications, devices can avoid some of the overhead that would otherwise be involved with routing to and from a network entity. D2D communications can also enable mesh networking and device-to-network relay functionality.

Vehicle-to-everything (V2X) communication is an example of D2D communication that is specifically geared toward automotive use cases. V2X communications may enable autonomous vehicles to communicate with each other. In some examples, V2X communications may enable a group of autonomous vehicles to share respective sensor information. For example, each autonomous vehicle may include multiple sensors or sensing technologies (for example, light detection and ranging (LiDAR), radar, cameras, etc.). In most cases, an autonomous vehicle's sensors are limited to detecting objects within the sensors' line of sight. In contrast, based on the sensor information shared via V2X communications, one or more autonomous vehicles in the group of autonomous vehicles may be made aware of an out of sight object. In such examples, the object may be within a line of sight of sensors associated with another autonomous vehicle in the group of autonomous vehicles. Additionally, or alternatively, based on the sensor information shared via V2X communications, two or more autonomous vehicle in the group of autonomous vehicles may coordinate one or more actions, such as avoiding the object or maintaining a pre-determined distance between the two or more autonomous vehicles.

Sidelink (SL) communication is another example of D2D communication that enables a user equipment (UE) to communicate with another UE without tunneling through a base station and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a base station and a UE. For instance, the PSCCH may carry sidelink control information (SCI) and the PSCCH may carry sidelink data (for example, user data). Each PSCCH is associated with a corresponding PSSCH, where SCI in a PSCCH may carry reservation and/or scheduling information for a sidelink data transmission in the associated PSSCH. Use cases for sidelink communications may include, among others, V2X, industrial Internet of Things (IoT) (IIoT), and/or NR-lite.

Orthogonal frequency division multiplexing (OFDM) signaling techniques may yield high peak-to-average power ratios (PAPRs) compared to single-carrier signaling techniques, which may increase power consumption of a power amplifier (PA) at a transmitter or reduce an efficiency of the PA at the transmitter, among other examples. Some wireless communications systems, such as sidelink communications systems or new radio (NR) sidelink communications, use an OFDM waveform for uplink, downlink, and sidelink transmissions. In some examples, uplink transmissions may also support a discrete Fourier transform spread OFDM (DFT-s-OFDM) waveform. However, downlink and sidelink transmissions may be limited to using the OFDM waveform. Therefore, a signal transmitted by a sidelink UE may have a high PAPR. As the PAPR increases, an efficiency of a PA may decrease. The efficiency of the PA may be determined based on, for example, a ratio of output power to input power for the PA. Sidelink UEs associated with PAs that have a decreased efficiency may consume more power or have other performance drawbacks.

Various aspects relate generally to applying peak suppression to sidelink transmissions. Some particular aspects enable PAPR reduction while maintaining network efficiency and mitigating an increase in latency. In some examples, a sidelink UE may include, for example, a peak suppression information message (PSIM) multiplexed with data or control information on one or more symbols of a sidelink message (e.g., sidelink transmission). In some aspects, to reduce PAPR, the sidelink UE may clip peaks corresponding to data samples of a time-domain data signal to reduce the amplitudes associated with the respective data samples such that they are below a clipping threshold or peak amplitude threshold. For example, a base station may perform an inverse fast Fourier transform (IFFT) on a frequency domain representation of a data message to obtain a time-domain data signal that includes data samples representing the data message in the time domain. The sidelink UE may then clip or remove peaks of the time-domain data signal by reducing the amplitudes of the data samples to below the clipping threshold or peak amplitude threshold. In some examples, the base station may subtract a portion of the amplitude of a peak to reduce the amplitude to below the clipping threshold. In some other examples, the sidelink UE may remove a peak amplitude entirely and replace the amplitude of the data sample with another amplitude, which may have a determined value, that is below the clipping threshold.

Along with clipping the peaks, the sidelink UE also generates peak suppression information associated with the clipped peaks, and transmits a PSIM that includes the peak suppression information to another sidelink UE. The peak suppression information may include amplitude information as well as position information and phase information associated with the clipped amplitude peaks of the transmitted sidelink message. The peak suppression information may also include information about filled signal values. The peak suppression information enables the other sidelink UE to reconstruct the original time-domain data signal from the clipped version, and ultimately reconstruct the sidelink message.

Particular aspects of the subject matter described in this disclosure may be implemented to realize one or more of the following potential advantages. The techniques employed by the described communications devices may allow a sidelink UE to more efficiently employ an OFDM waveform. In some aspects, by reducing the PAPR associated with transmitting a sidelink message, and by multiplexing peak suppression information with other data or control information, a sidelink UE may efficiently reduce power consumption for sidelink communications.

FIG. 1 is a diagram illustrating an example of a wireless communications system and an access network 100. The wireless communications system 100 (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system 100 may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include a NR BS, a Node B, a 5G node B, an eNB, a gNodeB (gNB), an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PSIM component 198 configured to perform operations, including operations of the process 1000 described below with reference to FIG. 10.

Although the following description may be focused on 5G NR, it may be applicable to other similar areas, such as LTE, LTE-A, CDMA, GSM, and other wireless technologies.

Figure 2:
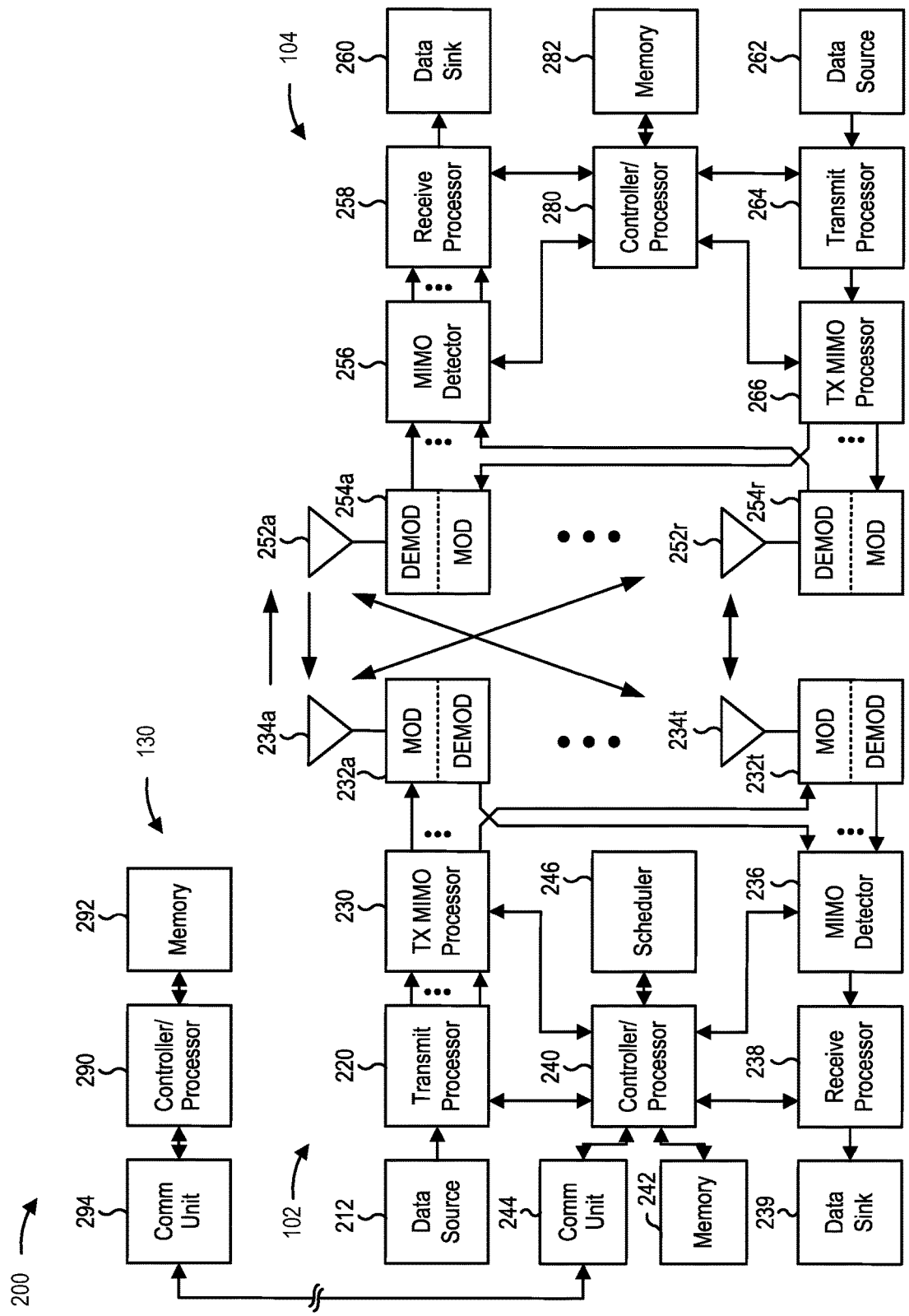
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 102 and UE 104, which may be one of the base stations and one of the UEs in FIG. 1, respectively. The base station 102 may be equipped with T antennas 234a through 234t, and UE 104 may be equipped with R antennas 252a through 252r, where in general T≥1 and R≥1.

At the base station 102, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 104, antennas 252a through 252r may receive the downlink signals from the base station 102 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 104 may be included in a housing.

On the uplink, at the UE 104, a transmit processor 264 may receive and process data from a data source 262 and control information (for example, for reports comprising RSRP, RSSI, RSRQ, CQI, and/or the like) from the controller/processor 280. The transmit processor 264 may also generate reference symbols for one or more reference signals. The symbols from the transmit processor 264 may be precoded by a TX MIMO processor 266 if applicable, further processed by modulators 254a through 254r (for example, for discrete Fourier transform spread (DFT-s)-OFDM, CP-OFDM, and/or the like), and transmitted to the base station 102. At the base station 102, the uplink signals from the UE 104 and other UEs may be received by the antennas 234, processed by the demodulators 254, detected by a MIMO detector 236 if applicable, and further processed by a receive processor 238 to obtain decoded data and control information sent by the UE 104. The receive processor 238 may provide the decoded data to a data sink 239 and the decoded control information to a controller/processor 240. The base station 102 may include communications unit 244 and communicate to the core network 130 via the communications unit 244. The core network 130 may include a communications unit 294, a controller/processor 290, and a memory 292.

The controller/processor 240 of the base station 102, the controller/processor 280 of the UE 104, and/or any other component(s) of FIG. 2 may perform one or more techniques associated with configuring a relay-based sidelink network as described in more detail elsewhere. For example, the controller/processor 240 of the base station 102, the controller/processor 280 of the UE 104, and/or any other component(s) of FIG. 2 may perform or direct operations of, for example, the processes of FIGS. 10 and 12 and/or other processes as described. Memories 242 and 282 may store data and program codes for the base station 102 and UE 104, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

At least one of the transmit processor 264, the receive processor 258, and the controller/processor 280 may be configured to perform aspects in connection with the PSIM component 198 of FIG. 1. Additionally, at least one of the transmit processor 220, the receive processor 238, and the controller/processor 240 may be configured to perform aspects in connection with the component 198.

In some aspects, the base station 102 and/or the UE 104 may include means for performing operations, including the operations of the process 1000 described below with reference to FIG. 10. Such means may include one or more components of the base station 102 and/or the UE 104 described in connection with FIGS. 1 and 2.

Figure 3:
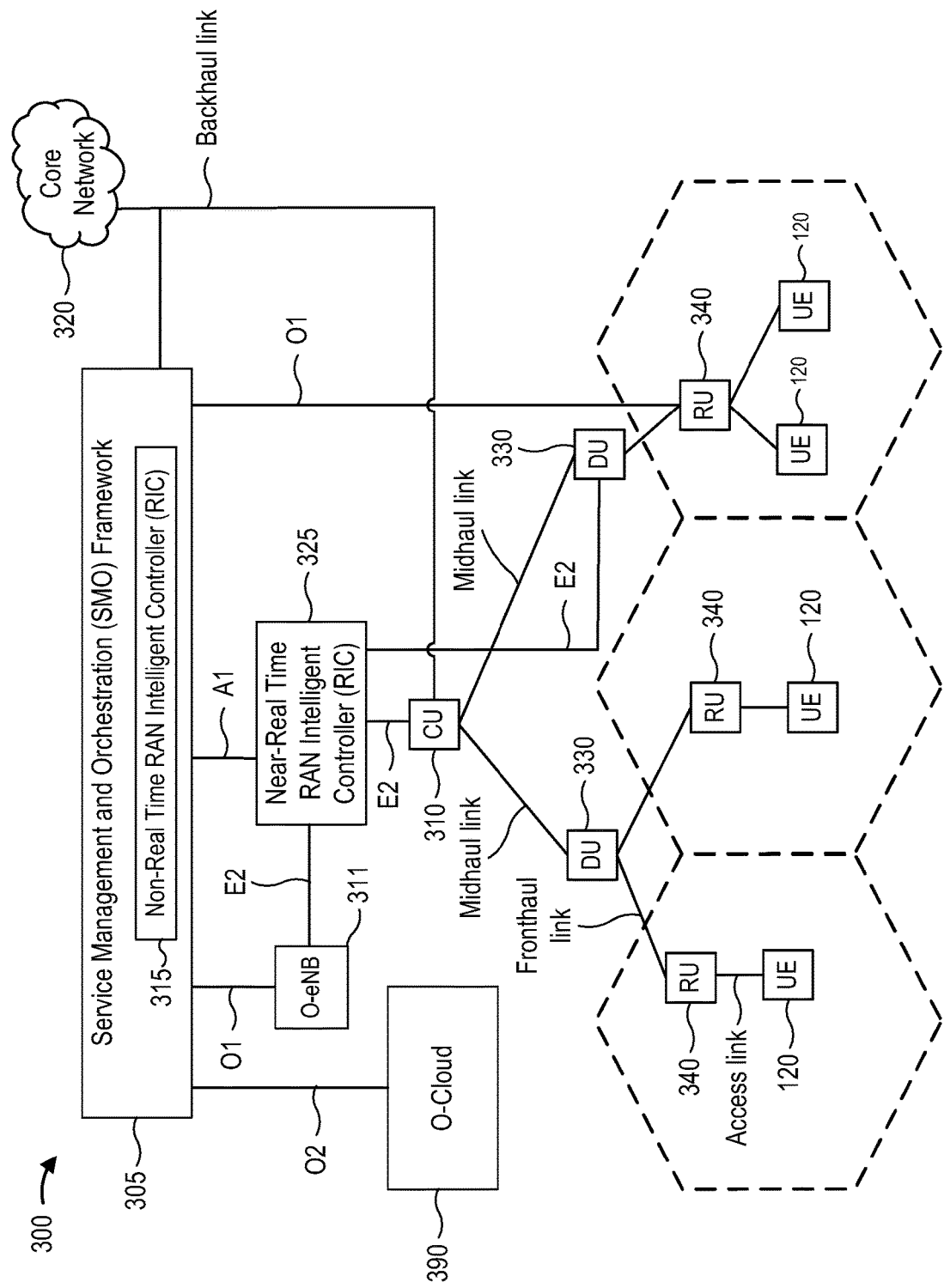
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (for example, the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

Figure 4:
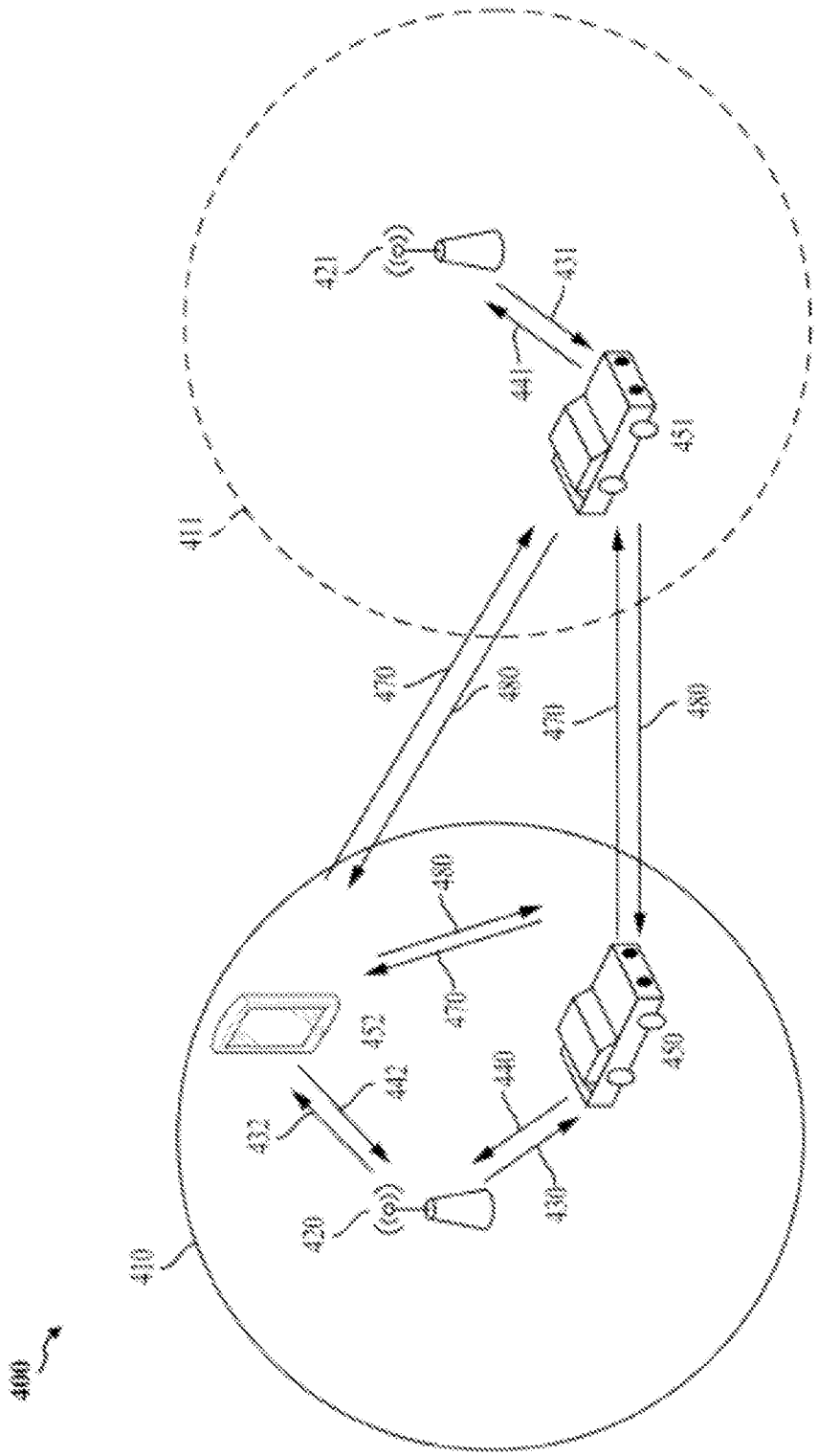
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., DL subframes and/or DL channels). The UL communications may be performed via the UL carrier 442 using various UL resources (e.g., UL subframes and/or UL channels).

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., DL subframes and/or DL channels). The UL communications may be performed via the UL carrier 440 using various UL resources (e.g., UL subframes and/or UL channels).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3. The second base station 421 may communicate with the second UE 451 via a DL carrier 431 and an UL carrier 441. The DL communications are performed via the DL carrier 431 using various DL resources (e.g., DL subframes and/or DL channels). The UL communications are performed via the UL carrier 441 using various UL resources (e.g., UL subframes and/or UL channels).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally, or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally, or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a roadside unit (RSU).

Figure 5:
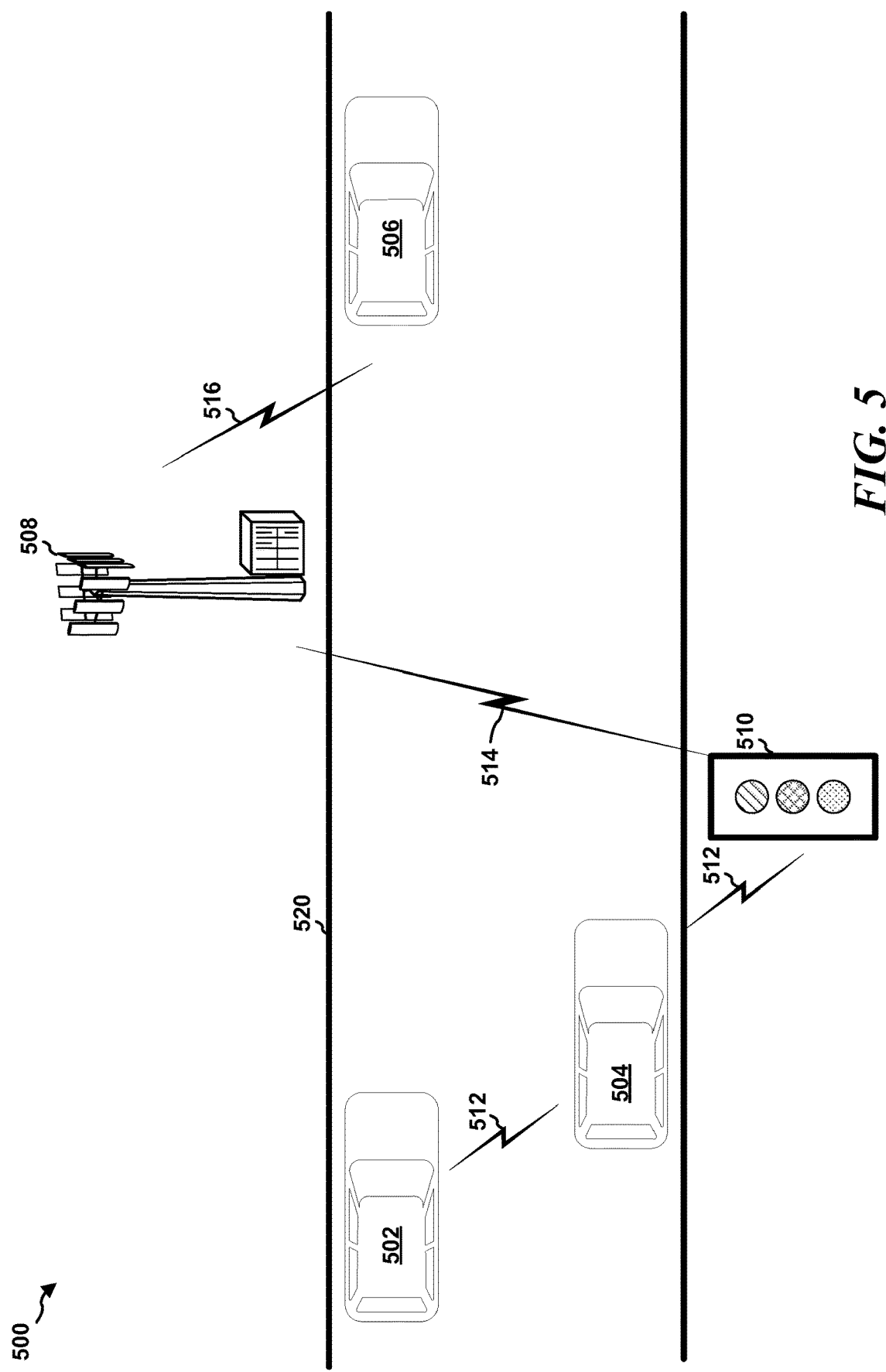
FIG. 5 is a block diagram illustrating an example of a vehicle-to-everything (V2X) system with a roadside unit (RSU), according to aspects of the present disclosure.

FIG. 5 illustrates an example of a vehicle-to-everything (V2X) system with a roadside unit (RSU), according to aspects of the present disclosure. As shown in FIG. 5, V2x system 500 includes a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally, or alternatively, RSUs 510 may be stand-alone units.

Figure 6:
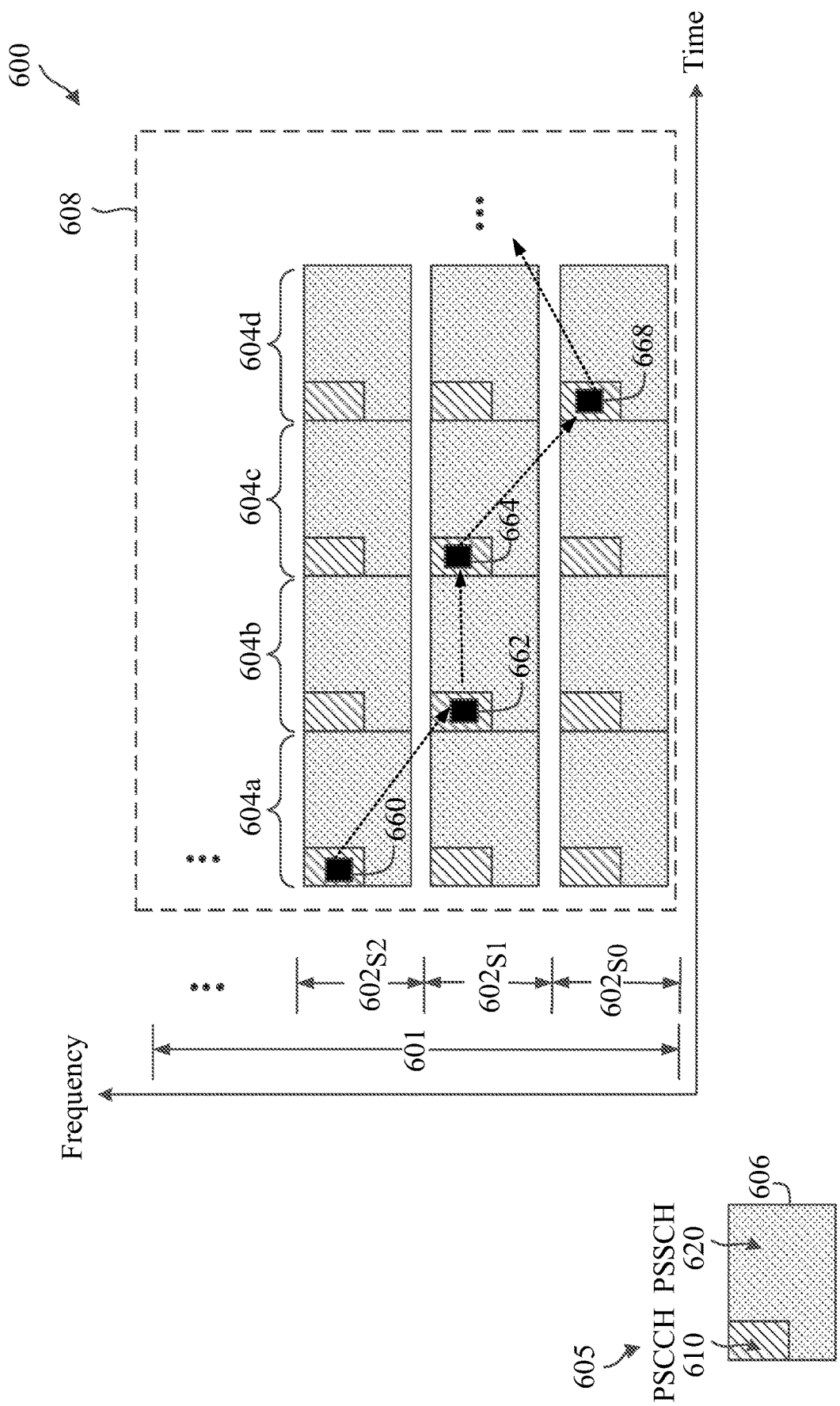
FIG. 6 is a graph illustrating a sidelink (SL) communications scheme, in accordance with various aspects of the present disclosure.

FIG. 6 is a graph illustrating a sidelink (SL) communications scheme, in accordance with various aspects of the present disclosure. A scheme 600 may be employed by UEs such as the UEs 104 in a network such as the network 100. In FIG. 6, the x-axis represents time and the y-axis represents frequency. The CV2X channels may be for 3GPP Release 16 and beyond.

In the scheme 600, a shared radio frequency band 601 is partitioned into multiple subchannels or frequency subbands 602 (shown as 602S0, 602S1, 602S2) in frequency and multiple sidelink frames 604 (shown as 604a, 604b, 604c, 604d) in time for sidelink communications. The frequency band 601 may be at any suitable frequencies. The frequency band 601 may have any suitable bandwidth (BW) and may be partitioned into any suitable number of frequency subbands 602. The number of frequency subbands 602 can be dependent on the sidelink communications BW requirement.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. The PSCCH 610 may be for part one of a control channel (CCH), with the second part arriving as a part of the shared channel allocation. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s) of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, hybrid automatic repeat request (HARQ) acknowledgment/negative acknowledgement (ACK/NACK) for sidelink data received in an earlier sidelink resource 606.

In an NR sidelink frame structure, the sidelink frames 604 in a resource pool 608 may be contiguous in time. A sidelink UE (e.g., the UEs 104) may include, in SCI 660, a reservation for a sidelink resource 606 in a later sidelink frame 604. Thus, another sidelink UE (e.g., a UE in the same NR-U sidelink system) may perform SCI sensing in the resource pool 608 to determine whether a sidelink resource 606 is available or occupied. For instance, if the sidelink UE detected SCI indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604a, the sidelink UE transmits SCI 660 in the sidelink resource 606 located in the frequency subband 602S2 to reserve a sidelink resource 606 in a next sidelink frame 604b located at the frequency subband 602S1. Similarly, during the sidelink frame 604b, the sidelink UE transmits SCI 662 in the sidelink resource 606 located in the frequency subband 602S1 to reserve a sidelink resource 606 in a next sidelink frame 604c located at the frequency subband 602S1. During the sidelink frame 604c, the sidelink UE transmits SCI 664 in the sidelink resource 606 located in the frequency subband 602S1 to reserve a sidelink resource 606 in a next sidelink frame 604d located at the frequency subband 602S0. During the sidelink frame 604d, the sidelink UE transmits SCI 668 in the sidelink resource 606 located in the frequency subband 602S0. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subband (e.g., via frequency division multiplexing (FDM)). For instance, in the sidelink frame 604b, one pair of sidelink UEs may communicate sidelink data using a sidelink resource 606 in the frequency subband 602S2 while another pair of sidelink UEs may communicate sidelink data using a sidelink resource 606 in the frequency subband 602S1.

In some aspects, the scheme 600 is used for synchronous sidelink communications. That is, the sidelink UEs may be synchronized in time and are aligned in terms of symbol boundary, sidelink resource boundary (e.g., the starting time of sidelink frames 604). The sidelink UEs may perform synchronization in a variety of forms, for example, based on sidelink synchronization signal blocks (SSBs) received from a sidelink UE and/or NR-U SSBs received from a base station (e.g., the base station 102) while in-coverage of the base station. In some aspects, the sidelink UE may be pre-configured with the resource pool 608 in the frequency band 601, for example, while in coverage of a serving base station. The resource pool 608 may include a plurality of sidelink resources 606. The base station can configure the sidelink UE with a resource pool configuration indicating resources in the frequency band 601 and/or the subbands 602 and/or timing information associated with the sidelink frames 604. In some aspects, the scheme 600 includes mode-2 RRA (e.g., supporting autonomous radio resource allocation (RRA) that can be used for out-of-coverage sidelink UEs or partial-coverage sidelink UEs).

Figure 7A:
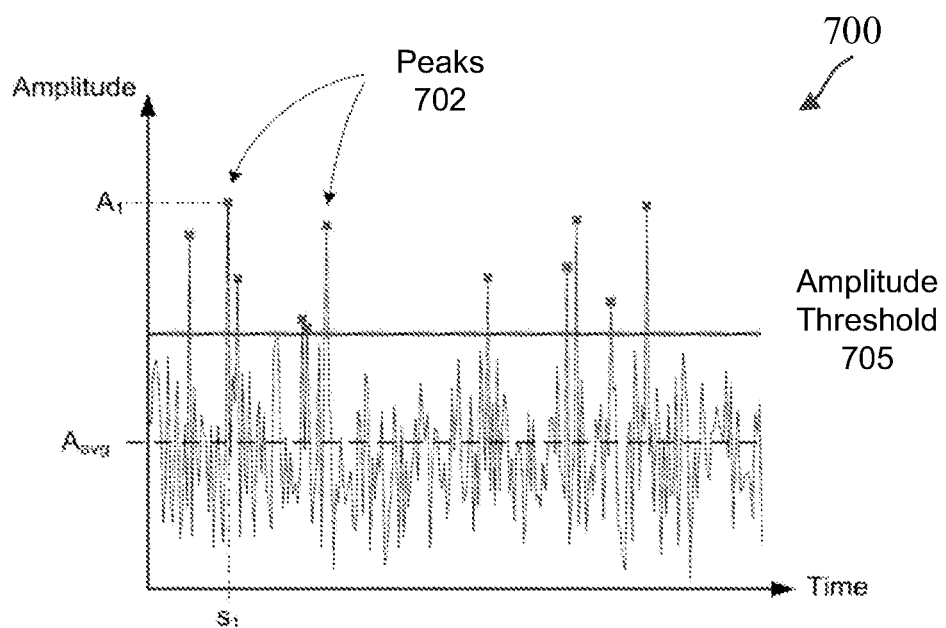
FIGS. 7A and 7B are diagrams illustrating examples of a data signal and a clipped data signal, respectively, in accordance with aspects of the present disclosure.
Figure 7B:
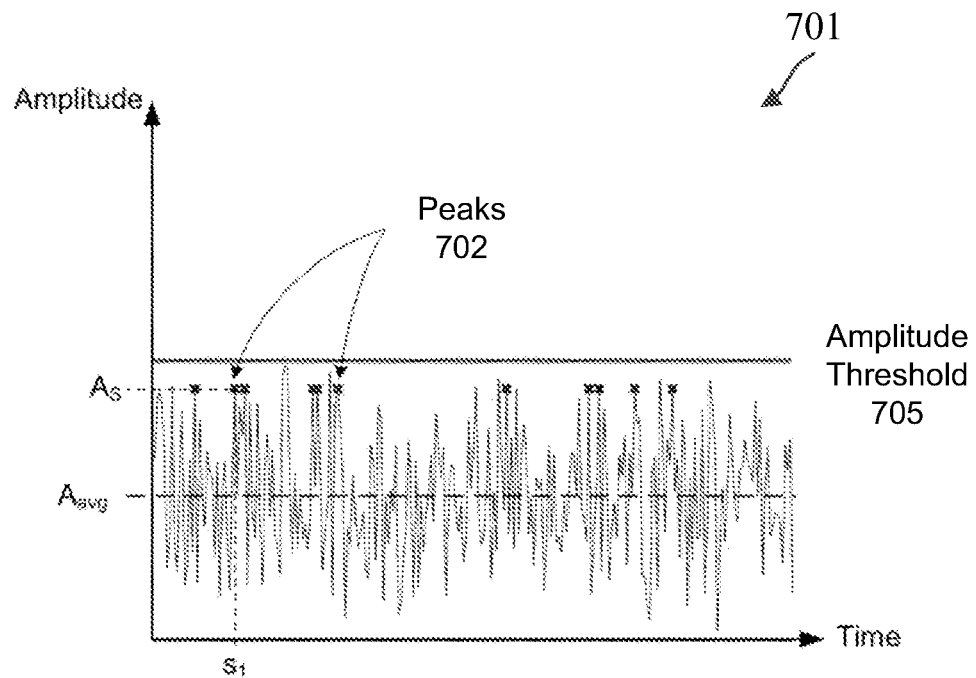

FIGS. 7A and 7B illustrate examples of a data signal 700 and a clipped data signal 701, respectively, in accordance with aspects of the present disclosure. In some examples, the data signal 700 and the clipped data signal 701 may implement aspects of a wireless communications system 100 or a D2D communication system 700. For example, a sidelink UE 104, 450, 451, 452, 502, 507, 506, or 510 or a sidelink network node 102, 420, 421, or 508 as described with reference to FIGS. 1, 2, 4, and 5, may clip a downlink message as illustrated by one or more aspects of the data signal 700 to produce a clipped data signal as illustrated by one or more aspects of the clipped data signal 701.

FIG. 7A shows an example data signal 700 for communications between wireless communication devices, according to some implementations. In some implementations, the data signal 700 may be one example of a sidelink signal. As shown with reference to FIG. 7A, the average amplitude (Aavg) of the data signal 700 may be less than an amplitude threshold 705 (for example, which may be referred to as a peak amplitude threshold, a clipping threshold, a clipping level, among other terms). In some implementations, the amplitude threshold 705 may be determined based on the average amplitude of the data signal 700 and a target or desired peak-to-average power ratio (PAPR). For example, the amplitude threshold 705 may be chosen as a cut-off for limiting the PAPR of the data signal 700. However, the data signal 700 may also include a number of peaks 702. Although only two of the peaks 702 are highlighted in the example of FIG. 7A, the peaks 702 may correspond to any samples of the data signal 700 having amplitudes that exceed the amplitude threshold 705. Each peak 702 may have a unique position (sn) in the data signal 700, an amplitude (An), and a phase (not shown for simplicity). For example, the peak 702 at position si has an amplitude $A_1$ that is significantly higher than the amplitude threshold 705. The presence of the peaks 702 may significantly increase the PAPR of the data signal 700.

In some implementations, a transmitting device (for example, a sidelink device, such as a sidelink UE) may reduce or mitigate the PAPR of the data signal 700 by suppressing the amplitudes of one or more peaks 702. For example, a peak detection and suppression component associated with the transmitting device may detect one or more peaks 702 in the data signal 700 and generate peak suppression information describing or determining the detected peaks 702. A base station may generate a PSIM that may include the positions (sn), amplitudes (An), and phases (not shown) of the peaks 702. In some aspects, the peak suppression information may be provided to an amplitude suppressor of a transmitting device. The amplitude suppressor may adjust the data signal 700 by reducing or suppressing the amplitudes of the samples associated with the peaks 702. More specifically, the amplitude suppressor may generate an amplitude-suppressed data signal (for example, a clipped data signal 701) by replacing or substituting each of the peak amplitudes in the data signal 700 with a suppressed amplitude. In some implementations, the suppressed amplitude may be a known or pre-configured amplitude value that is less than or equal to a corresponding amplitude threshold.

FIG. 7B shows an example of a clipped data signal 701 for communications between wireless communication devices, according to some implementations. In some implementations, the clipped data signal 701 may be one example of a clipped sidelink signal. More specifically, the clipped data signal 701 may be an example of the data signal 700 of FIG. 7A, after suppressing the amplitudes of the peaks 702. Compared to the data signal 700 of FIG. 7A, the amplitude of the clipped data signal 701 may not exceeds the amplitude threshold 705. More specifically, the amplitude of each of the peaks 702 may be reduced to a suppressed amplitude value (As) in the clipped data signal 701. In some implementations, each of the peaks 702 may be reduced to the same suppressed amplitude value. In some other implementations, different peaks 702 may be reduced to different suppressed amplitude values. The suppressed amplitude values may include any amplitude value less than or equal to the amplitude threshold 705. As a result, the PAPR of the clipped data signal 701 may be significantly lower than the PAPR of the data signal 700 of FIG. 7A.

Chopping (or reducing) the peak amplitudes of a data signal may degrade an error vector magnitude (EVM) at the transmitter. For example, the EVM of the clipped data signal 701 may be worse than the EVM of the original data signal 700. In some implementations, the base station may provide or otherwise indicate the peak suppression information to the receiving device (for example, a receiving sidelink UE) to compensate for the degradation in EVM of the clipped data signal 701. For example, a PSIM control component may generate a PSIM based on the peak suppression information. In some aspects, the PSIM may include raw data representative of the peak suppression information (for example, including the position, amplitude, and phase of each peak).

In some aspects, the PSIM may be compressed. For example, it is noted that an amplitude suppressor (for example, a clipper) may not alter the phases of the data signal 700 if generating the clipped data signal 701. Accordingly, in some implementations, the phase information may be excluded from the PSIM to reduce the overhead of the message. The peak amplitudes also may be represented as polar amplitudes in the PSIM. By using polar notation, the amplitudes of the peaks may be reduced without changing their phases. Other suitable compression techniques may include, but are not limited to, wavelet compression, per-antenna representation of the position of each peak, analog coding, and limiting the peak position vector to a number of known options. In some implementations, the PSIM control component may compress the peak suppression information by quantizing the peak amplitudes into one or more quantization levels.

Figure 8A:
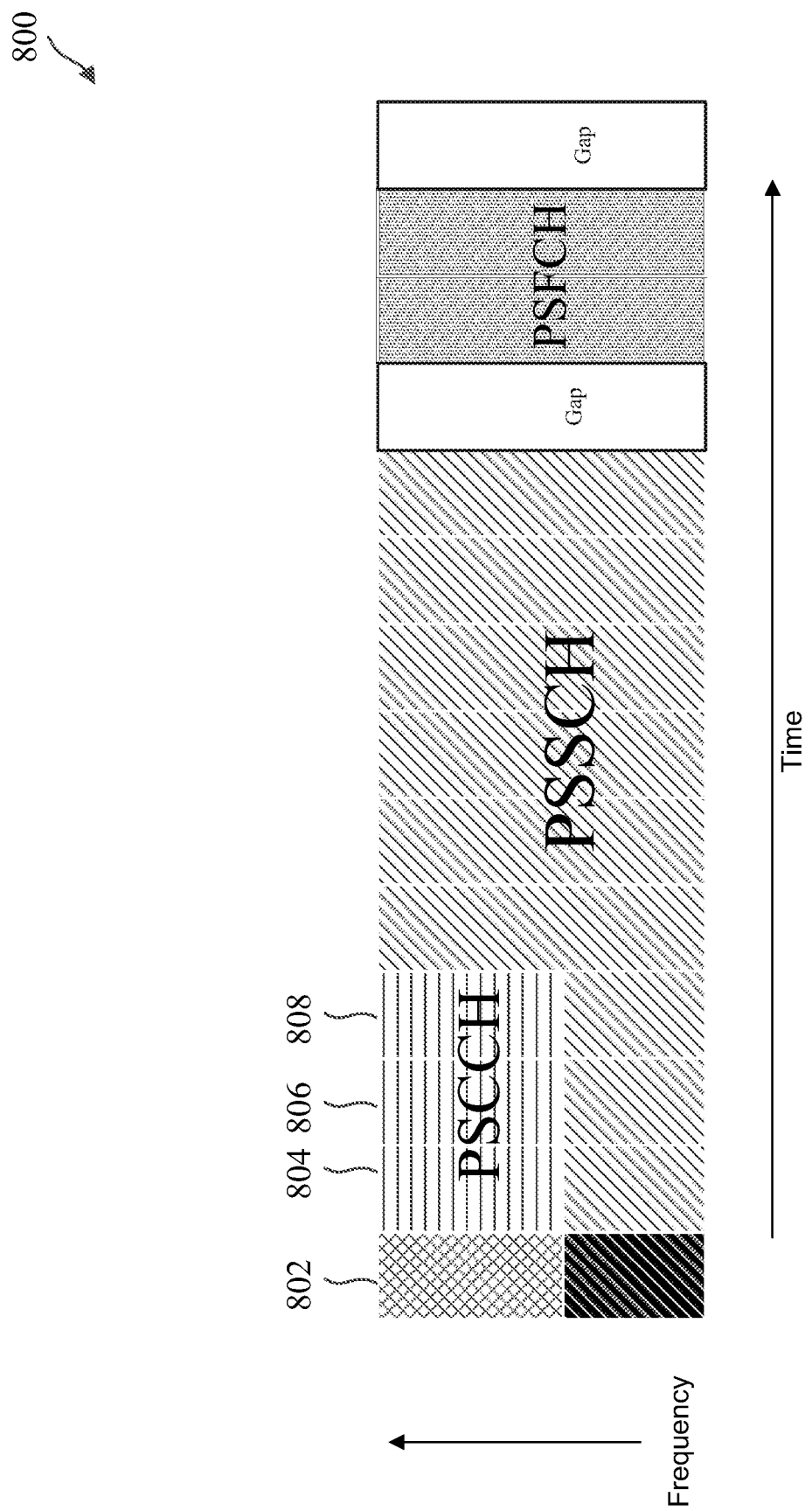
FIGS. 8A and 8B are diagrams illustrating examples of symbols associated with a sidelink transmission.

As discussed, sidelink communications, such as NR sidelink communications, use OFDM as the single waveform. Therefore, the PAPR signal property affects the sidelink system performance. FIG. 8A is a block diagram illustrating an example of symbols associated with a sidelink transmission 800. In the example of FIG. 8A, a first symbol 802 of sidelink transmission may be an automatic gain control (AGC) symbol. One or more symbols may be allocated for a physical sidelink control channel (PSCCH) and other symbols may be allocated for a physical sidelink shared channel (PSSCH). In some examples, such as the example of FIG. 8A, the PSCCH may be multiplexed on symbols allocated to the PSSCH. As shown in FIG. 8A, two symbols may be allocated to a physical sidelink feedback channel (PSFCH). Gap symbols may be allocated before and after the PSFCH symbols. In the example of FIG. 8A, the PSSCH may be frequency division multiplexed (FDMed) with the PSCCH on the second, third, and fourth symbols, 804, 806, and 808, respectively.

The AGC symbol may be used for AGC calibration. In such cases, a receiver (e.g., receiving sidelink UE) may estimate the arriving signal power and tune the hardware to receive the sidelink transmission (e.g., signals associated with the sidelink transmission). AGC calibration performance may also depend on the PAPR property of the waveform. Signals with higher PAPR may be associated with a longer AGC calibration time or less accurate AGC settings. In contrast, signals with lower PAPR may be associated with less AGC calibration time or more accurate AGC settings.

Therefore, as discussed, it may be desirable to reduce the PAPR associated with sidelink signals. In some examples, reducing the PAPR may increase an accuracy of AGC calibration. To reduce communication errors, an error between an estimated signal power and true signal power should be less than a threshold for a period of time. For example, it may be desirable for the error to be less than 3 dB for 99.99% of the time. In some examples, the estimation error may be reduced if arriving signals are associated with a reduced PAPR. AGC calibration performance may improve sidelink communications because sidelink transmissions are uncoordinated, and interference may vary from slot to slot. Sidelink transmissions include a dedicated symbol to account for the varying interference.

Additionally, or alternatively, reducing the PAPR may improve sidelink performance. For example, by reducing the PAPR, a transmitter (e.g., sidelink UE) may use a linear region of a PA and transmit the sidelink signal with lower distortion. Additionally, a receiver may also use the PA to amplify the received signal to improve signal decoding. Reducing the distortion of the sidelink signal and amplifying the received signal may increase a signal-to-noise ratio (SNR) at the receiver, thereby improving the sidelink performance.

Additionally, or alternatively, reducing the PAPR may improve channel estimations. Some sidelink use cases, such as V2X, target high mobility UEs. In such cases, reducing the PAPR for symbols that include a demodulation reference signal (DM-RS) may improve an accuracy of channel estimations based on DM-RS measurements.

In some examples, peak suppression may be limited to the AGC symbol, such as symbol 802 described with reference to FIG. 8A. Applying peak suppression to the AGC symbol may improve AGC calibration. In some sidelink transmissions, the AGC symbol may be a duplicate of a second symbol of a sidelink transmission. In some examples, when applying peak suppression to the AGC symbol, the AGC symbol may not be a duplicate of the second symbol.

In some examples, a sidelink UE may be configured by a network node to apply peak suppression to the AGC symbol. In some such examples, the configuration may be included in a sidelink resource pool configuration. Additionally, the network node may configure the sidelink UE to apply the peak suppression during mode 1 operation. In some other examples, during mode 2 operation, the network node may configure the sidelink UE to apply the peak suppression in response to a request from the sidelink UE.

In some examples, the sidelink UE transmits a peak suppression information message (PSIM) to a receiver (e.g., receiving sidelink UE). The PSIM may include information about peaks and filled signal values. In some examples, the PSIM may not be transmitted because the receiver may not need to reconstruct the original AGC symbol. The original AGC symbol refers to the AGC symbol prior to the applied peak suppression. In such examples, the AGC symbol may only be used for calibrating the AGC and not for data decoding.

In some other examples, the PSIM may be transmitted to the receiver, such that the receiver may reconstruct the original AGC symbol and use the reconstructed AGC symbol to decode data. In such examples, the PSIM may be included in stage 2 sidelink control information (SCI-2). Alternatively, the PSIM may be included in a medium access control (MAC) control element (MAC-CE) transmitted in a PSSCH. In some examples, the peak suppression may be applied to the second symbol of the sidelink message because the AGC may be a copy of the second symbol. In such examples, the PSIM may be used to reconstruct the AGC symbol and the second symbol.

Additionally, or alternatively, in some examples, the peak suppression may be applied to symbols that include the PSCCH, such as the symbols associated with the PSCCH shown in the example of FIG. 8A. In some other examples, the peak suppression may be applied to a symbol that only includes the PSCCH, in contrast to symbols that include the PSCCH multiplexed with the PSSCH. A decoding probability specified for the PSCCH may be higher than a decoding probability specified for data transmissions, such as transmissions on a PSSCH. Therefore, applying the peak suppression to symbols that include the PSCCH may reduce the PAPR associated with the PSCCH and improve the decoding probability of the PSCCH at a receiver. The symbols associated with the PSCCH may begin from the second symbol in a sidelink transmission.

In some examples, a sidelink UE may be configured by a network node to apply peak suppression to the PSCCH symbols. For example, the network node may schedule the sidelink UE to apply peak suppression to the PSCCH symbols. In some such examples, the configuration may be included in a sidelink resource pool configuration and/or a PSCCH configuration. Additionally, the network node may configure the sidelink UE to apply the peak suppression during mode 1 operation. In some other examples, during mode 2 operation, the network node may configure the sidelink UE to apply the peak suppression in response to a request from the sidelink UE. In some other examples, the sidelink UE may apply peak suppression to the PSCCH symbols when one or more conditions are satisfied. The one or more conditions may include: a channel busy ratio (CBR) of the PSCCH exceeding a CBR ratio; a traffic priority associated with PSCCH traffic exceeding a priority threshold; the PAPR associated with the PSCCH symbols exceeding a PAPR threshold; an amount of bandwidth occupied by a PSSCH exceeding a bandwidth threshold when the PSCCH is frequency division multiplexed (FDMed) with the PSSCH; or a modulation and coding scheme (MCS) associated with the PSSCH exceeding an MCS threshold when the PSCCH is frequency division multiplexed with the PSSCH. In some examples, the peak suppression may suppress peaks associated with PSCCH signals and PSSCH signals based on the PSCCH being frequency division multiplexed with the PSSCH. Additionally, or alternatively, a receiving sidelink UE may configure a transmitting sidelink UE to apply peak suppression on one or more symbols, such as, but not limited to an AGC symbol, PSSCH symbols, PSCCH symbols, SCI-2 symbols, DM-RS symbols, and/or a combination of frequency division multiplexed symbols.

In some examples, a sidelink UE (e.g., transmitter) identifies the peaks associated with the PSCCH sidelink symbols and determines peak suppression information for each of the PSCCH sidelink symbols. For ease of explanation, sidelink symbols may be referred to as symbols. The sidelink UE may compress the peak suppression information into a PSIM that includes the peak suppression information. A size of the PSIM may be pre-configured. In some examples, the PSIM may be included in the AGC symbol. In such examples, the PSIM may be used for both AGC and reconstructions of PSSCH sidelink symbols. That is, a receiver (e.g., receiver sidelink UE) may extract peak suppression information from the PSIM included in the AGC symbol. In some other examples, the PSIM may be transmitted on a dedicated resource within a slot.

Additionally, or alternatively, in some examples, the peak suppression may be applied to symbols that include the PSSCH, such as the symbols associated with the PSSCH shown in the example of FIG. 8A. In some other examples, the peak suppression may be applied to symbol that only include the PSSCH, in contrast to symbols that include the PSCCH multiplexed with the PSSCH. The symbols associated with the PSCCH may begin from the second symbol in a sidelink transmission.

Figure 8B:
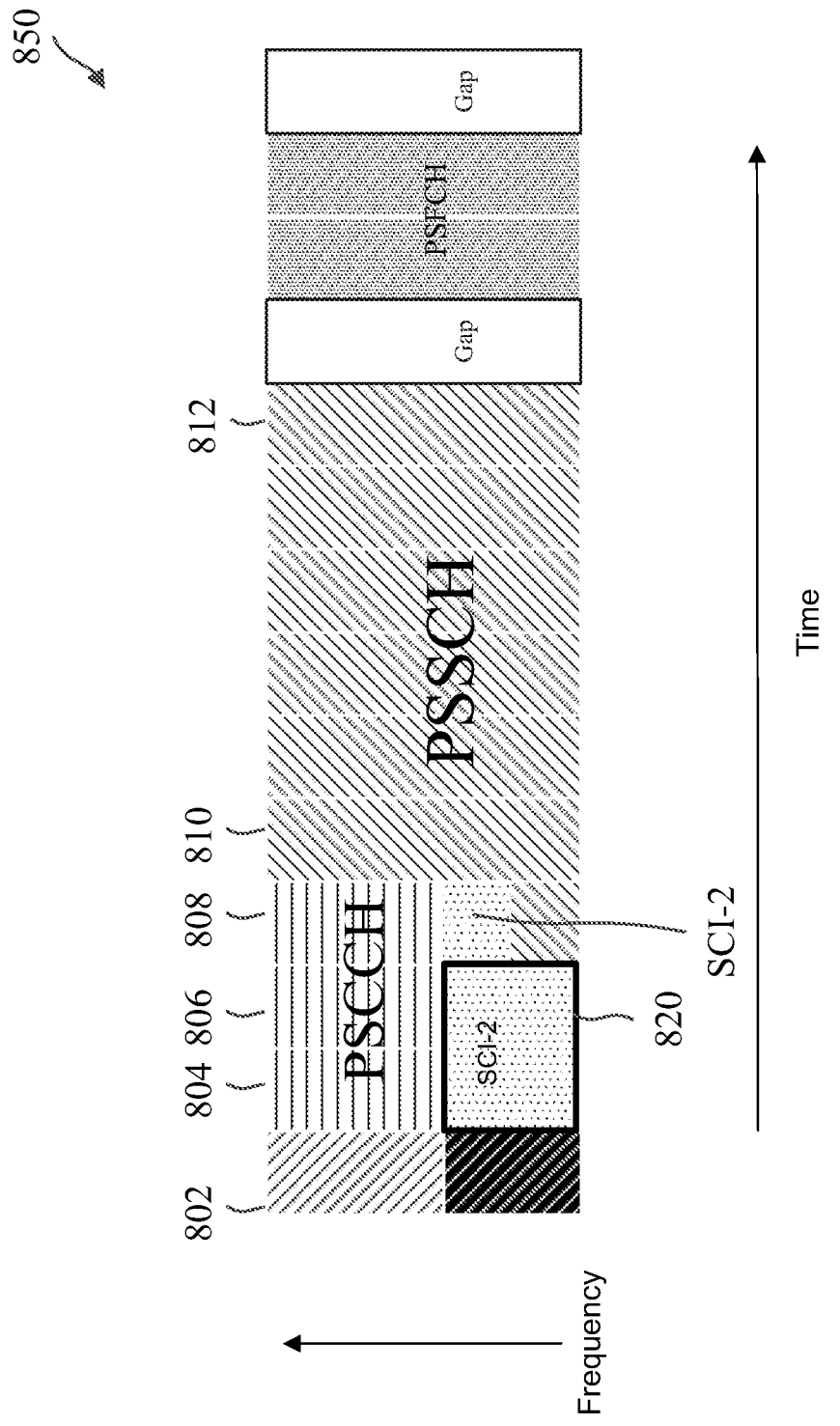

In some examples, stage 2 sidelink control information (SCI-2) may be multiplexed with the PSSCH. FIG. 8B is a block diagram illustrating an example of SCI-2 multiplexed with the PSSCH in one or more sidelink symbols of a sidelink transmission 850. As shown in the example of FIG. 8B, SCI-2 may be multiplexed with the PSSCH on the second, third, and fourth symbols 804, 806, and 808, respectively, of the sidelink transmission 850. As previously discussed, the first symbol 802 may be an AGC symbol. Additionally, the second, third, and fourth symbols 804, 806, and 808, respectively, of the sidelink transmission 850 may also include a PSCCH. SCI-2 may uses quadrature phase shift keying (QPSK), which may not increase a PAPR. Still, the PSSCH may use a higher MCS, which increases the PAPR. In some examples, peak suppression may be applied to the PSSCH sidelink symbols if an MCS or PAPR associated with the PSSCH exceed respective thresholds.

In some examples, the peak suppression may be applied to the PSSCH sidelink symbols that exclude SCI-2. In the example of FIG. 8B, the symbols that exclude the SCI-2 begin at the fifth symbol 810 and end at the tenth symbol 812. In such examples, peak suppression may not be applied to symbols that included the PSCCH frequency division multiplexed with SCI-2, such as the second symbol 804 and third symbol 806 of the sidelink transmission 850, because these symbols may use QPSK, which may not increase a PAPR. Additionally, peak suppression may be applied to symbols where the PSCCH, PSSCH, and SCI-2 are frequency division multiplexed, such as the fourth symbol 808 of the sidelink transmission 850, when one or more conditions are satisfied. In some examples, the one or more conditions include an MCS associated with the PSSCH being greater than a threshold, a percentage of resources exclusively occupied by the PSSCH being greater than a percentage of resources occupied by the PSCCH frequency division multiplexed with SCI-2, or a percentage of resources exclusively occupied by the PSSCH being greater than an occupancy threshold. Additionally, peak suppression may be applied to symbols where the SCI-2 is frequency division multiplexed with the PSSCH when one or more conditions are satisfied. In some examples, the one or more conditions include an MCS associated with the PSSCH being greater than a threshold, or a percentage of resources occupied by the SCI-2, or a percentage of resources exclusively occupied by the PSSCH being greater than an occupancy threshold. Furthermore, peak suppressions may be applied to symbols that only include the PSSCH, such as the fifth symbol 810 through the tenth symbol 812 of the sidelink transmission 850. In some examples, the peak suppression may be applied to symbols that only include the PSSCH based on the MCS being greater than an MCS threshold. Additionally, or alternatively, peak suppression may be applied to PSSCH symbols (e.g., symbols that only include the PSSCH) that include DM-RSs if a PAPR associated with the PSSCH symbols is greater than a PAPR threshold.

In some other examples, peak suppression may be applied to PSSCH symbols that include SCI-2. In such examples, peak suppression may not be applied to symbols with the PSCCH and/or symbols with the PSSCH frequency division multiplexed with SCI-2 and the PSCCH. In such examples, SCI-2 resources 820 (shown in FIG. 8B) that are frequency division multiplexed with the PSCCH may be used to transmit the PSIM to a receiver. The PSIM may indicate suppression information about the PSSCH symbols with a PAPR that is greater than a PAPR threshold. In some examples, peak suppression may be applied to PSSCH symbols that include SCI-2, or symbols with the PSSCH frequency division multiplexed with SCI-2. In some such examples, the peak suppression may be applied when a condition is satisfied. For example, the condition may be satisfied if an amount of resources allocated to SCI-2 is less than an allocation threshold.

In examples where peak suppression may be applied to PSSCH symbols that include SCI-2, a size of the PSIM may be pre-configured. Additionally, SCI-2 or a new SCI-2 format may include bit fields to include the PSIM. In some examples, a size of the PSIM may be configurable based on an SCI-2 format indicated in stage 1 SCI (SCI-1). Alternatively, a size of the PSIM may be configurable based on a beta_offset value indicated in SCI-1. In some examples, SCI-1 includes two bits representing the beta_offset value, wherein the beta_offset value indicates a number of resources used for transmitting SCI-2. A one-to-one mapping of beta_offset value to PSIM size may be configured. The configuration may be associated with a resource pool configuration, in sidelink mode 2, or by a network node, in sidelink mode 1.

In some examples, a sidelink UE may be configured by a network node to apply peak suppression to the PSSCH symbols. For example, the network node may schedule the sidelink UE to apply peak suppression to the PSSCH symbols. In some such examples, the configuration may be included in a sidelink resource pool configuration and/or a PSSCH configuration. Additionally, the network node may configure the sidelink UE to apply the peak suppression during mode 1 operation. In some other examples, during mode 2 operation, the network node may configure the sidelink UE to apply the peak suppression in response to a request from the sidelink UE. In some other examples, the sidelink UE may apply peak suppression to the PSSCH symbols when one or more conditions are satisfied. The one or more conditions may include: a channel busy ratio (CBR) of the PSSCH exceeding a CBR threshold; a traffic priority associated with PSSCH traffic exceeding a priority threshold; the PAPR associated with the PSSCH symbols exceeding a PAPR threshold; an amount of bandwidth occupied by a PSSCH exceeding a bandwidth threshold when the PSCCH is frequency division multiplexed with the PSSCH; or a modulation and coding scheme (MCS) associated with the PSSCH exceeding an MCS threshold when the PSCCH is frequency division multiplexed with the PSSCH. In some examples, the peak suppression may suppress peaks associated with PSCCH signals and PSSCH signals based on the PSCCH being frequency division multiplexed with the PSSCH. Additionally, or alternatively, a receiving sidelink UE may configure a transmitting sidelink UE to apply peak suppression on one or more symbols, such as, but not limited to an AGC symbol, PSSCH symbols, PSCCH symbols, SCI-2 symbols, DM-RS symbols, and/or a combination of frequency division multiplexed symbols.

In some examples, peak suppression may be applied to sidelink symbols that only include DM-RSs. Sidelink supports two, three, or four DM-RS symbols. The number of DM-RS symbols may be indicated in SCI-1. The peak suppression may be applied to protect the DM-RS symbols, thereby improving channel estimation accuracy. For example, peak suppression may be applied to sidelink symbols that include DM-RSs in high mobility use cases, such as V2X communication use cases. In such use cases, performance may be reduced due to channel estimation errors. Therefore, improving channel estimation accuracy may improve the sidelink communications, such as the V2X communications. In examples where peak suppression may be applied to sidelink symbols that only include DM-RSs, a PSIM size may be pre-configured or based on a number of DM-RS symbols indicated in SCI-1. In some examples, the PSIM is transmitted on symbols carrying the DM-RSs. The DM-RSs may not be associated with high PAPR, therefore, the PSIM associated with a low MCS may be frequency division multiplexed with the DM-RSs.

Aspects of the present disclosure are not limited to applying peak suppression to only the AGC, PSSCH, PSCCH, or DM-RS symbols. Various aspects of the present disclosure may be combined to reduce the PAPR associated with a sidelink transmission.

Figure 9:
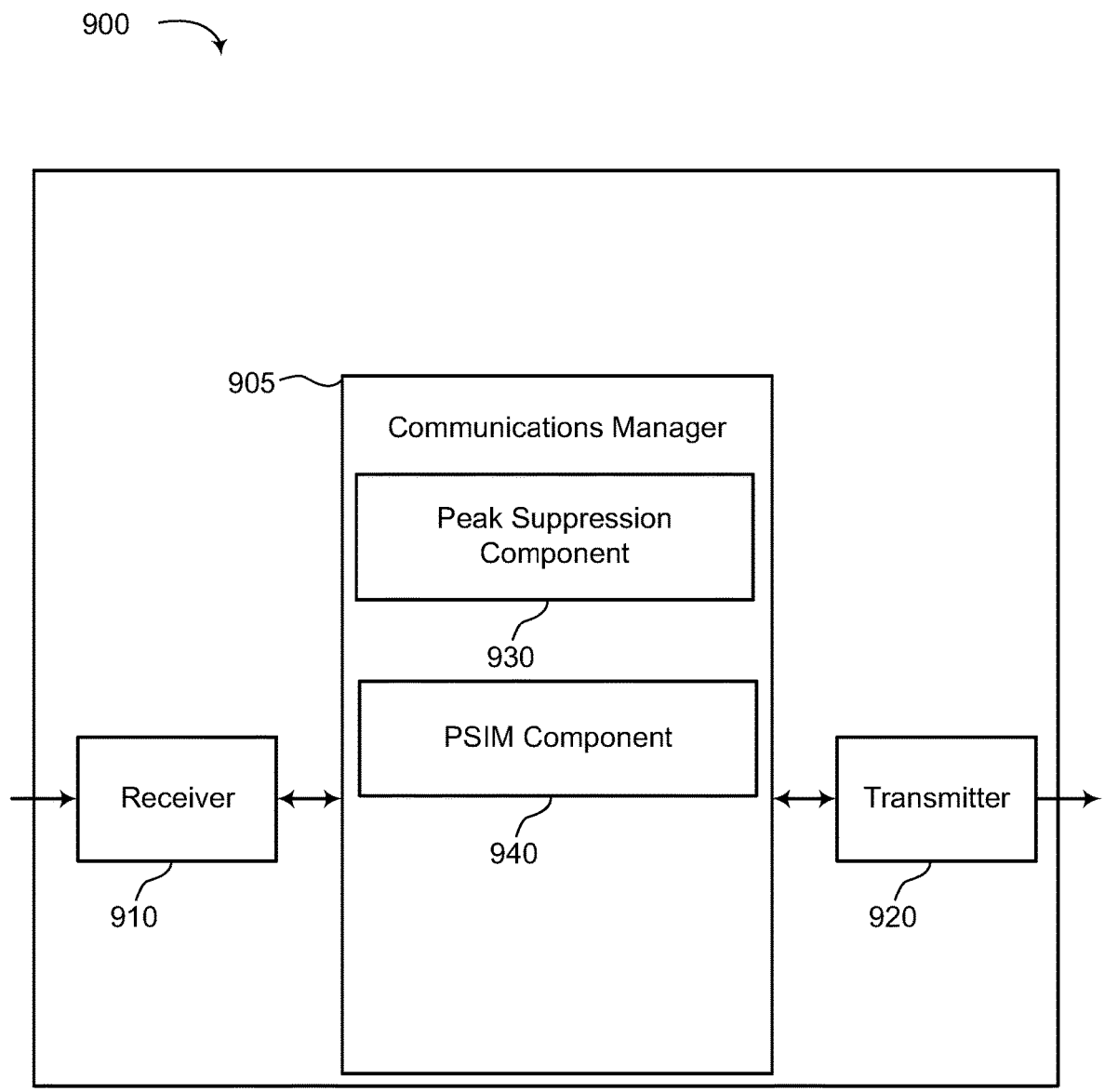
FIG. 9 is a block diagram illustrating an example wireless communication device that supports applying peak suppression to sidelink transmissions, in accordance with various aspects of the present disclosure.

FIG. 9 is a block diagram illustrating an example wireless communication device 900 that supports applying peak suppression to sidelink transmissions, in accordance with some aspects of the present disclosure. The device 900 may be an example of aspects of a sidelink UE 104, 450, 451, 452, 502, 504, 506, or 510 or a sidelink network node 102, 420, 421, or 508 as described with reference to FIGS. 1, 2, 4, and 5. The wireless communication device 900 may include a receiver 910, a communications manager 905, a transmitter 920, a peak suppression component 930, and a PSIM component 940 which may be in communication with one another (for example, via one or more buses). The peak suppression component 930 and PSIM component 940 may be components of, or work in conjunction with, the PSIM component 198 described with reference to FIG. 1. In some examples, the wireless communication device 900 is configured to perform operations, including operations of the process 1000 described below with reference to FIG. 10.

In some examples, the wireless communication device 900 can include a chip, chipset, package, or device that includes at least one processor and at least one modem (for example, a 5G modem or other cellular modem). In some examples, the communications manager 905, or its subcomponents, may be separate and distinct components. In some examples, at least some components of the communications manager 905 are implemented at least in part as software stored in a memory. For example, portions of one or more of the components of the communications manager 905 can be implemented as non-transitory code executable by the processor to perform the functions or operations of the respective component.

The receiver 910 may receive one or more reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical sidelink control channel (PSCCH) and data channels (for example, a physical downlink shared channel (PDSCH), physical sidelink shared channel (PSSCH), a physical uplink shared channel (PUSCH)). The other wireless communication devices may include, but are not limited to, a base station 102 as described with reference to FIGS. 1 and 2, a CU 310, DU 330, or RU 340 as described with reference to FIG. 3.

The received information may be passed on to other components of the device 900. The receiver 910 may be an example of aspects of the receive processor 258 described with reference to FIG. 2. The receiver 910 may include a set of radio frequency (RF) chains that are coupled with or otherwise utilize a set of antennas (for example, the set of antennas may be an example of aspects of the antennas 252 described with reference to FIG. 2).

The transmitter 920 may transmit signals generated by the communications manager 905 or other components of the wireless communication device 900. In some examples, the transmitter 920 may be collocated with the receiver 910 in a transceiver. The transmitter 920 may be an example of aspects of the transmit processor 294 described with reference to FIG. 2. The transmitter 920 may be coupled with or otherwise utilize a set of antennas (for example, the set of antennas may be an example of aspects of the antennas 252 described with reference to FIG. 2), which may be antenna elements shared with the receiver 910. In some examples, the transmitter 920 is configured to transmit control information in a PUCCH, PSCCH, or PDCCH and data in a physical uplink shared channel (PUSCH), PSSCH, or PDSCH.

The communications manager 905 may be an example of aspects of the controller/processor 280 described with reference to FIG. 2. The communications manager 905 may include the peak suppression component 930 and the PSIM component 940. In some examples, working in conjunction with the transmitter 920, the peak suppression component 930 may suppress one or more signal peaks associated with a sidelink message based on a configuration for suppressing the one or more signal peaks associated with the sidelink message. Additionally, working in conjunction with the peak suppression component 930, the PSIM component 940 may selectively transmit, to a second sidelink UE, a peak information suppression message (PSIM) indicating the one or more suppressed signal peaks and/or one or more filled signal values based on suppressing the one or more signal peaks. Finally, working in conjunction with the peak suppression component 930 and the transmitter 920, the communications manager 905 may transmit the sidelink message, to the second sidelink UE, based on suppressing the one or more signal peaks.

Figure 10:
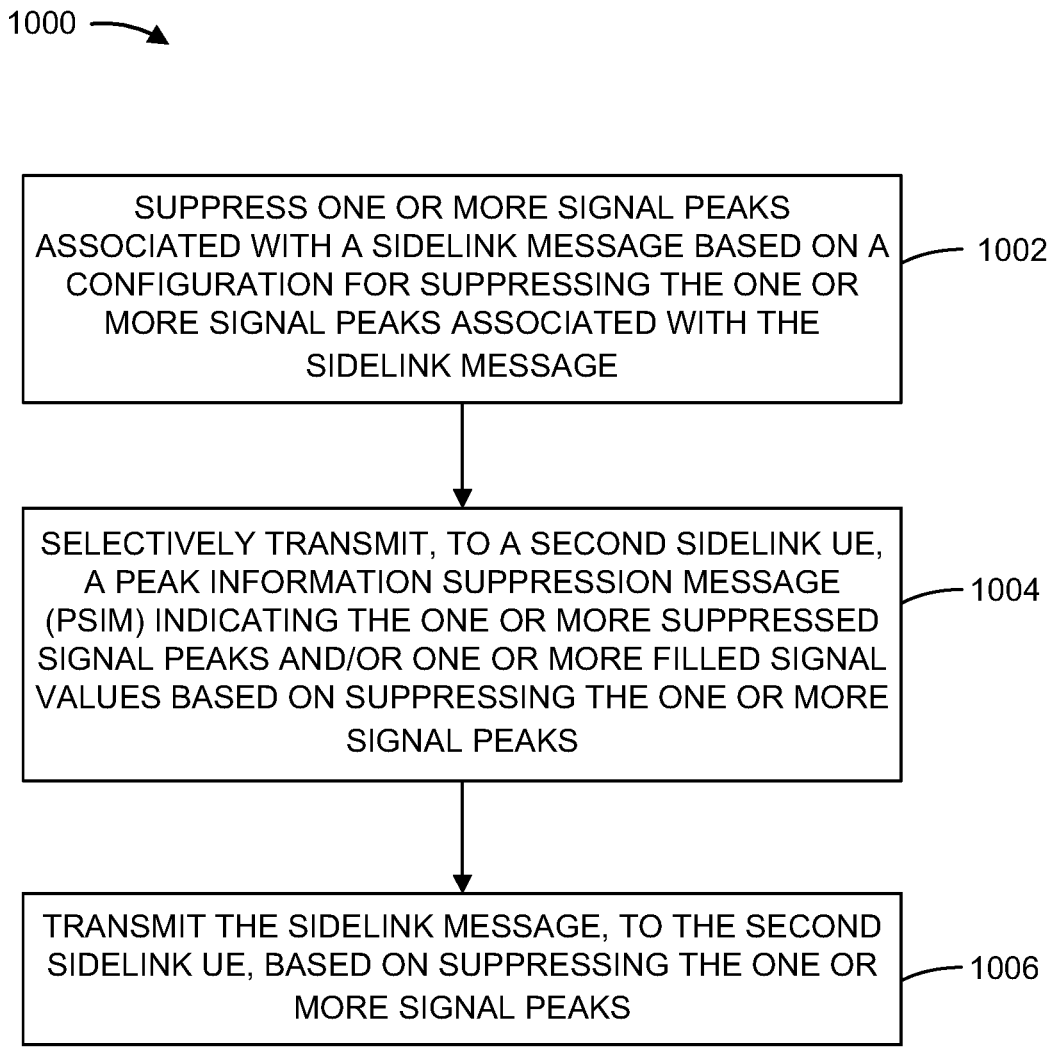
FIG. 10 is a flow diagram illustrating an example process performed by a sidelink device, in accordance with various aspects of the present disclosure.

FIG. 10 is a flow diagram illustrating an example process 1000 performed by a sidelink device, such as a sidelink UE 104, 450, 451, 452, 502, 504, 506, or 510 or a sidelink network node 102, 420, 421, or 508 as described with reference to FIGS. 1, 2, 4, and 5, in accordance with some aspects of the present disclosure. The example process 1000 is an example of a updating a local data distribution. As shown in the example of FIG. 10, at block 1002, the process 1000 suppresses one or more signal peaks associated with a sidelink message based on a configuration for suppressing the one or more signal peaks associated with the sidelink message. Furthermore, at block 1004, the process 1000 selectively transmits, to a second sidelink UE, a peak information suppression message (PSIM) indicating the one or more suppressed signal peaks and/or one or more filled signal values based on suppressing the one or more signal peaks. Finally, at block 1006, the process 1000 transmits the sidelink message, to the second sidelink UE, based on suppressing the one or more signal peaks.

Implementation examples are described in the following numbered clauses:

Clause 1. A method for wireless communication by a first sidelink user equipment (UE), comprising: suppressing one or more signal peaks associated with a sidelink message based on a configuration for suppressing the one or more signal peaks associated with the sidelink message; selectively transmitting, to a second sidelink UE, a peak information suppression message (PSIM) indicating the one or more suppressed signal peaks and/or one or more filled signal values based on suppressing the one or more signal peaks; and transmitting the sidelink message, to the second sidelink UE, based on suppressing the one or more signal peaks.

Clause 2. The method of Clause 1, wherein the one or more signal peaks are suppressed in an automatic gain control (AGC) symbol associated with the sidelink message.

Clause 3. The method of any one of Clauses 1-2, further comprising receiving a sidelink resource pool configuration message, wherein the configuration is included in the sidelink resource pool configuration message.

Clause 4. The method of any one of Clauses 1-3, wherein the PSIM is included in a second stage sidelink control information (SCI-2) message, a medium access control (MAC) control element (MAC-CE), or a second symbol of the sidelink message.

Clause 5. The method of any one of Clauses 1-4, wherein the configuration is received based on a request by the first sidelink UE, scheduling associated with a network node, or a triggering condition.

Clause 6. The method of Clause 5, wherein the triggering condition includes: a constant bit rate (CBR) exceeding a CBR threshold; traffic priority exceeding a traffic priority threshold; a peak-to-average power ration (PAPR) of one or more symbols, of the sidelink message, exceeding a PAPR threshold; a bandwidth used by a physical sidelink shared channel (PSSCH) multiplexed with physical sidelink control channel (PSCCH) exceeding a bandwidth threshold; or a modulation and coding scheme (MCS) for the PSSCH multiplexed with the PSCCH exceeding an MCS threshold.

Clause 7. The method of Clause 5, wherein the PSIM is included in an automatic gain control (AGC) symbol associated with the sidelink message or a dedicated resource.

Clause 8. The method of Clause 7, wherein the one or more signal peaks are suppressed in one or more symbols, of the sidelink message, associated with a physical sidelink control channel (PSCCH).

Clause 9. The method of Clause 8, wherein the configuration is received in a sidelink resource pool configuration message and/or a PSCCH configuration message.

Clause 10. The method of Clause 5, wherein the one or more signal peaks are suppressed in one or more symbols, of the sidelink message, associated with a physical sidelink shared channel (PSSCH).

Clause 11. The method of Clause 10, wherein the one or more symbols exclude second stage sidelink control information (SCI-2).

Clause 12. The method of any one of Clauses 1-7, wherein the one or more signal peaks are suppressed in one or more symbols, of the sidelink message, that include a demodulation reference signal (DM-RS).

Clause 13. The method of Clause 12, wherein the PSIM is included in the one or more symbols.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a first sidelink user equipment (UE), comprising:
suppressing, at the first sidelink UE, one or more signal peaks associated with a sidelink message based on a configuration for suppressing the one or more signal peaks associated with the sidelink message;

selectively transmitting, from the first sidelink UE to a second sidelink UE, a peak information suppression message (PSIM) indicating the one or more suppressed signal peaks and/or one or more filled signal values based on suppressing the one or more signal peaks; and transmitting the sidelink message, from the first sidelink UE to the second sidelink UE, based on suppressing the one or more signal peaks at the first sidelink UE.

2. The method of claim 1, wherein the one or more signal peaks are suppressed in an automatic gain control (AGC) symbol associated with the sidelink message.

3. The method of claim 2, further comprising receiving a sidelink resource pool configuration message, wherein the configuration is included in the sidelink resource pool configuration message.

4. The method of claim 2, wherein the PSIM is included in a second stage sidelink control information (SCI-2) message, a medium access control (MAC) control element (MAC-CE), or a second symbol of the sidelink message.

5. The method of claim 1, wherein the configuration is received based on a request by the first sidelink UE, scheduling associated with a network node, or a triggering condition.

6. The method of claim 5, wherein the triggering condition includes: a constant bit rate (CBR) exceeding a CBR threshold; traffic priority exceeding a traffic priority threshold;
a peak-to-average power ration (PAPR) of one or more symbols, of the sidelink message, exceeding a PAPR threshold; a bandwidth used by a physical sidelink shared channel (PSSCH) multiplexed with a physical sidelink control channel (PSCCH) exceeding a bandwidth threshold; or a modulation and coding scheme (MCS) for the PSSCH multiplexed with the PSCCH exceeding an MCS threshold.

7. The method of claim 5, wherein the PSIM is included in an automatic gain control (AGC) symbol associated with the sidelink message or a dedicated resource.

8. The method of claim 7, wherein the one or more signal peaks are suppressed in one or more symbols associated with a PSCCH.

9. The method of claim 8, wherein the configuration is received in a sidelink resource pool configuration message and/or a PSCCH configuration message.

10. The method of claim 5, wherein the one or more signal peaks are suppressed in one or more symbols, of the sidelink message, associated with a physical sidelink shared channel (PSSCH).

11. The method of claim 10, wherein the one or more symbols exclude second stage sidelink control information (SCI-2).

12. The method of claim 1, wherein the one or more signal peaks are suppressed in one or more symbols, of the sidelink message, that include a demodulation reference signal (DM-RS).

13. The method of claim 12, wherein the PSIM is included in the one or more symbols.

14. An apparatus for wireless communications at a first sidelink user equipment (UE), comprising:
at least one processor, and
at least one memory coupled with the at least one processor and storing instructions operable, when executed by the at least one processor, to cause the apparatus to:
suppress, at the first sidelink UE, one or more signal peaks associated with a sidelink message based on a configuration for suppressing the one or more signal peaks associated with the sidelink message;
selectively transmit, from the first sidelink UE to a second sidelink UE, a peak information suppression message (PSIM) indicating the one or more suppressed signal peaks and/or one or more filled signal values based on suppressing the one or more signal peaks; and
transmit the sidelink message, from the first sidelink UE to the second sidelink UE, based on suppressing the one or more signal peaks at the first sidelink UE.

15. The apparatus of claim 14, wherein the one or more signal peaks are suppressed in an automatic gain control (AGC) symbol associated with the sidelink message.

16. The apparatus of claim 15, wherein:
execution of the instructions further cause the apparatus to receive a sidelink resource pool configuration message; and
the configuration is included in the sidelink resource pool configuration message.

17. The apparatus of claim 15, wherein the PSIM is included in a second stage sidelink control information (SCI-2) message, a medium access control (MAC) control element (MAC-CE), or a second symbol of the sidelink message.

18. The apparatus of claim 14, wherein:
the configuration is received based on one of a request by the first sidelink UE, scheduling associated with a network node, or a triggering condition; and
the triggering condition includes: a constant bit rate (CBR) exceeding a CBR threshold;
traffic priority exceeding a traffic priority threshold; a peak-to-average power ration (PAPR) of one or more symbols, of the sidelink message, exceeding a PAPR threshold; a bandwidth used by a physical sidelink shared channel (PSSCH) multiplexed with a physical sidelink control channel (PSCCH) exceeding a bandwidth threshold; or a modulation and coding scheme (MCS) for the PSSCH multiplexed with the PSCCH exceeding an MCS threshold.

19. The apparatus of claim 18, wherein the PSIM is included in an automatic gain control (AGC) symbol associated with the sidelink message or a dedicated resource.

20. The apparatus of claim 19, wherein the one or more signal peaks are suppressed in one or more symbols associated with a PSCCH.

21. The apparatus of claim 14, wherein the one or more signal peaks are suppressed in one or more symbols, of the sidelink message, that include a demodulation reference signal (DM-RS).

22. A non-transitory computer-readable medium having program code recorded thereon for wireless communications at a first sidelink user equipment (UE), the program code executed by a processor and comprising:
program code to suppress, at the first sidelink UE, one or more signal peaks associated with a sidelink message based on a configuration for suppressing the one or more signal peaks associated with the sidelink message;
program code to selectively transmit, from the first sidelink UE to a second sidelink UE, a peak information suppression message (PSIM) indicating the one or more suppressed signal peaks and/or one or more filled signal values based on suppressing the one or more signal peaks; and
program code to transmit the sidelink message, from the first sidelink UE to the second sidelink UE, based on suppressing the one or more signal peaks at the first sidelink UE.

23. The non-transitory computer-readable medium of claim 22, wherein the one or more signal peaks are suppressed in an automatic gain control (AGC) symbol associated with the sidelink message.

24. The non-transitory computer-readable medium of claim 23, wherein:
the program code further include program code to receive a sidelink resource pool configuration message; and
the configuration is included in the sidelink resource pool configuration message.

25. The non-transitory computer-readable medium of claim 23, wherein the PSIM is included in a second stage sidelink control information (SCI-2) message, a medium access control (MAC) control element (MAC-CE), or a second symbol of the sidelink message.

26. The non-transitory computer-readable medium of claim 22, wherein:
the configuration is received based on one of a request by the first sidelink UE, scheduling associated with a network node, or a triggering condition; and
the triggering condition includes: a constant bit rate (CBR) exceeding a CBR threshold; traffic priority exceeding a traffic priority threshold; a peak-to-average power ration (PAPR) of one or more symbols, of the sidelink message, exceeding a PAPR threshold; a bandwidth used by a physical sidelink shared channel (PSSCH) multiplexed with a physical sidelink control channel (PSCCH) exceeding a bandwidth threshold; or a modulation and coding scheme (MCS) for the PSSCH multiplexed with the PSCCH exceeding an MCS threshold.

27. The non-transitory computer-readable medium of claim 26, wherein the PSIM is included in an automatic gain control (AGC) symbol associated with the sidelink message or a dedicated resource.

28. The non-transitory computer-readable medium of claim 27, wherein the one or more signal peaks are suppressed in one or more symbols associated with a PSCCH.

29. The non-transitory computer-readable medium of claim 22, wherein the one or more signal peaks are suppressed in one or more symbols, of the sidelink message, that include a demodulation reference signal (DM-RS).

30. An apparatus for wireless communication at a first sidelink user equipment (UE), comprising:
means for suppressing, at the first sidelink UE, one or more signal peaks associated with a sidelink message based on a configuration for suppressing the one or more signal peaks associated with the sidelink message;
means for selectively transmitting, from the first sidelink UE to a second sidelink UE, a peak information suppression message (PSIM) indicating the one or more suppressed signal peaks and/or one or more filled signal values based on suppressing the one or more signal peaks; and
means for transmitting the sidelink message, at the first sidelink UE to the second sidelink UE, based on suppressing the one or more signal peaks at the first sidelink UE.

* * * * *